United States Patent
Shoda et al.

(10) Patent No.: US 10,334,161 B2
(45) Date of Patent: Jun. 25, 2019

(54) IMAGE PROCESSING APPARATUS, IMAGE PROCESSING METHOD, COMPUTER PROGRAM AND IMAGING APPARATUS

(71) Applicant: CANON KABUSHIKI KAISHA, Tokyo (JP)

(72) Inventors: Satoshi Shoda, Utsunomiya (JP); Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 14/848,568

(22) Filed: Sep. 9, 2015

(65) Prior Publication Data

US 2016/0094784 A1    Mar. 31, 2016

(30) Foreign Application Priority Data

Sep. 30, 2014 (JP) ................................. 2014-202274

(51) Int. Cl.
*H04N 5/232* (2006.01)

(52) U.S. Cl.
CPC .............................. *H04N 5/23229* (2013.01)

(58) Field of Classification Search
CPC .............. G02B 3/0056; G02B 27/0075; G02B 3/0062; G06T 3/4015; H04N 5/23229; H04N 9/045; H04N 5/2254
See application file for complete search history.

(56) References Cited

U.S. PATENT DOCUMENTS

| 7,009,640 B1* | 3/2006 | Ishii ...................... H04N 1/603 348/223.1 |
| 7,732,744 B2 | 6/2010 | Utagawa |
| 2003/0133607 A1* | 7/2003 | Goto .................... H04N 1/6072 382/162 |
| 2006/0098229 A1* | 5/2006 | Matsunaga ............... G06T 1/20 358/2.1 |
| 2006/0139669 A1 | 6/2006 | Takahashi |
| 2009/0140131 A1* | 6/2009 | Utagawa .............. G02B 3/0056 250/226 |
| 2013/0087875 A1* | 4/2013 | Kobayashi .......... H01L 27/1461 257/432 |
| 2014/0146218 A1* | 5/2014 | Kunieda ............ H04N 5/23212 348/345 |

(Continued)

FOREIGN PATENT DOCUMENTS

| JP | 2006-186594 A | 7/2006 |
| JP | 2007-004471 A | 1/2007 |

*Primary Examiner* — Roberto Velez
*Assistant Examiner* — Tuan H Le
(74) *Attorney, Agent, or Firm* — Venable LLP

(57) ABSTRACT

An image processing apparatus includes a system controlling unit including a processor and a memory, the system controlling unit being configured to load and to execute an operation control program stored in the memory. The system controlling unit and the memory are configured to acquire light field data, including a plurality of divided image data, to perform an image processing including color correction processing to each of the plurality of divided image data, and to form image data by combining pixel signals of the plurality of the divided image data. Depths of field of the plurality of divided image data are deeper than those of the formed image data. The system controlling unit controls operation to perform the image processing and to form the image using the processed plurality of divided image data.

20 Claims, 9 Drawing Sheets

(56) References Cited

U.S. PATENT DOCUMENTS

| | | | |
|---|---|---|---|
| 2014/0205193 A1* | 7/2014 | Umezu | H04N 5/2355 382/169 |
| 2015/0235611 A1* | 8/2015 | Hiramoto | G09G 5/02 345/600 |
| 2015/0281540 A1* | 10/2015 | Matsuoka | H04N 5/2355 348/362 |
| 2016/0182792 A1* | 6/2016 | Aoki | G03B 9/02 348/364 |

* cited by examiner

SYNTHETIC IMAGE OF
SHIFT AMOUNT 0

SYNTHETIC IMAGE OF
SHIFT AMOUNT 100

IMAGE PROCESSING APPARATUS, IMAGE PROCESSING METHOD, COMPUTER PROGRAM AND IMAGING APPARATUS

BACKGROUND OF THE INVENTION

Field of the Invention

The present invention relates to an image processing apparatus, and particularly relates to an image processing apparatus which processes an image based on light field data that enables re-focus, and an imaging apparatus to which the image processing apparatus is applied.

Description of the Related Art

In recent years, an imaging apparatus such as a digital camera is known which has a function of performing image processing of a specific region of a photographed object image. For instance, Japanese Patent Application Laid-Open No. 2006-186594 discloses a technology which can perform color conversion processing of converting a region having color information which is specified by a user, into a color which is similarly specified by the user.

By the way, a technology is known which can obtain an image that focuses different distances of field by one time of photographing. Japanese Patent Application Laid-Open No. 2007-4471 discloses a technology of generating image data (re-focus image) by one time of photographing, which can be acquired on an arbitrary focal plane, by imaging luminous fluxes that have passed through different regions on an exit pupil of an imaging optical system with an imaging device, and synthesizing an obtained imaged signal (light field data).

SUMMARY OF THE INVENTION

In the imaging apparatus described in Japanese Patent Application Laid-Open No. 2006-186594, when blurring occurs in an object region having a color which is an object to be converted, there is the case where an intended color conversion processing result cannot be obtained due to color mixture which occurs in the blurring region. Such a problem is not limited to the above described color conversion processing, and a similar problem occurs also in cases where imaging processing with the use of information specific to the object is applied, and different image processes are applied to each region of the object.

On the other hand, in the imaging apparatus described in Japanese Patent Application Laid-Open No. 2007-4471, when a plurality of re-focus images, in which focus positions are different, are generated from the same scene, and the images are uniformly subjected to similar image processing, the image processing is performed every time the images are synthesized, and as a result, the image processing becomes complicated.

For this reason, an object of the present invention is to provide an image processing apparatus that can avoid incorrect correction of an image by image processing, which originates in the blurring, and efficiently perform image processing, when performing image processing of an image, for instance, a re-focus image or the like.

According to an aspect of the present invention, an image processing apparatus comprises: an acquiring unit configured to acquire light field data formed by an imaging unit having a pupil dividing function of an exit pupil of an imaging optical system for forming an optical image of an object; an image processing unit configured to perform a set image processing of an image data; an image forming unit configured to form the image data to be subjected to the set image processing, using the light field data; and a control unit configured to control the image processing unit, to perform the set processing of the image data formed, to form the light field data corrected according to the predetermined image processing.

The present invention can provide an image processing apparatus that is enabled to correct light field data so as to correspond to the image processing, and can prevent incorrect correction of an image by various image processes, which originates in blurring, in image processing of a re-focus image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[Exemplary Embodiment 1]

A first exemplary embodiment of the present invention will be described below with reference to FIG. 1 to FIG. 6.

Figure 1:
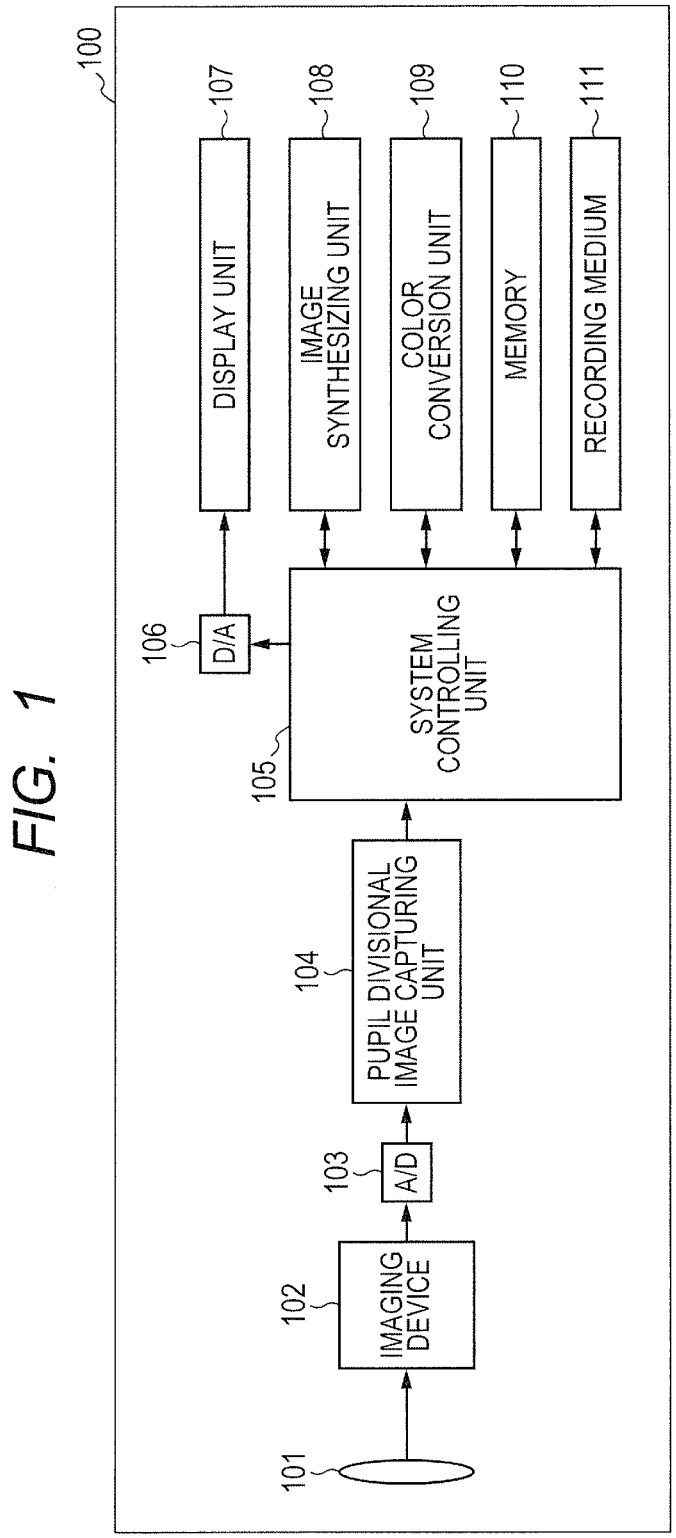
FIG. 1 is a block diagram illustrating a configuration of an imaging apparatus to which an image processing apparatus according to a first exemplary embodiment of the present invention is applied.

FIG. 1 is a block diagram illustrating a configuration of an imaging apparatus 100 to which an image processing apparatus according to a first exemplary embodiment of the present invention is applied. In FIG. 1, an imaging optical system 101 guides incident light emitted from an object to an imaging device 102 through an unillustrated plurality of lens groups and a diaphragm. Luminous fluxes which have passed through the imaging optical system 101 form optical images on the imaging device 102. The imaging device 102 has a pixel array in which pixels provided with color filters of R (red) G (green) and B (blue) are arranged according to a Bayer array, and one pixel includes at least a pair of photoelectric conversion units therein. The details of the imaging device 102 and the pixel will be described later.

An A/D conversion unit 103 converts an analog image signal which has been output from the imaging device 102, into a digital signal. A pupil divisional image generating unit 104 generates a pair of pupil divisional image data from a signal output from the A/D conversion unit 103. The detailed operation of the pupil divisional image generating unit 104 will also be described later. A system controlling unit 105 controls the whole imaging apparatus according to the state in the inside of the imaging apparatus, in an operation such as photographing and recording. A D/A conversion unit 106 converts the digital image signal into the analog signal, and outputs the converted signal to a display unit 107.

The display unit 107 is a liquid crystal display such as an LCD, and displays image data stored in an EVF or a recording medium 111, various setting screens and the like, thereon. An image synthesizing unit 108 generates a synthetic image from a plurality of images. The detailed operation of the image synthesizing unit 108 will be described later. A color conversion unit 109 performs color conversion processing of converting a predetermined color in an image into another predetermined color. The details of the color conversion unit 109 will be described later.

A memory 110 is a memory for storing an operation control program, an image, operation data and various parameters in the inside of the camera therein, and previously stores parameters to be used for various image processes, information in a lookup table, and information on shading characteristics and the like therein. A recording medium 111 is a recording medium such as an SD card and Compact Flash, and records photographed image data therein.

Figure 2:
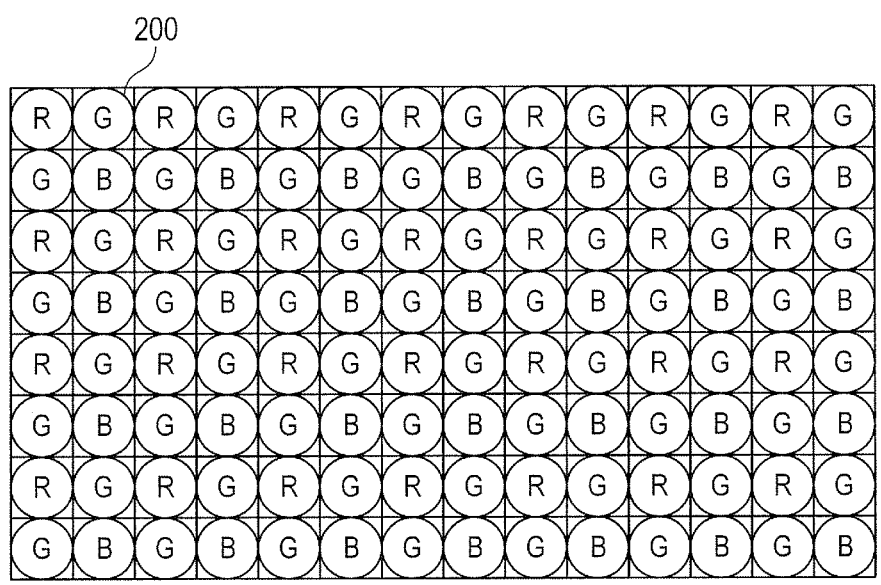
FIG. 2 is a view schematically illustrating an example of an array configuration of pixels having color filters, in an imaging device.

Next, the configuration of the imaging device 102 in the present exemplary embodiment will be described with reference to FIG. 2 to FIG. 4. FIG. 2 is an enlarged view of a part of a light-receiving region in the imaging device 102. In the light-receiving region of the imaging device 102, pixels having color filters 200 of any one of R, G and B thereon are arranged according to the Bayer array, as is illustrated in FIG. 2.

Next, the configuration of the pixels of the imaging device 102 will be described with reference to FIG. 3A and FIG. 3B.

Figure 3A:
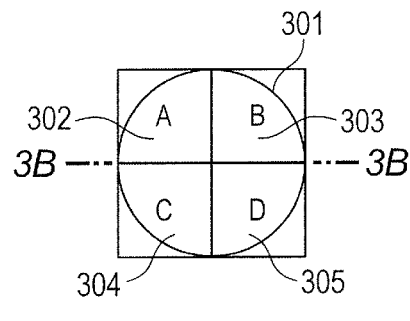
FIGS. 3A and 3B are views illustrating a configuration example of a pixel having divisional pixels.

FIG. 3A is a view of one of the pixels in the imaging device 102, which is observed from a top face. FIG. 3B is a sectional view of the pixel cut along a line 3B-3B illustrated in FIG. 3A. Incidentally, in FIG. 3A and FIG. 3B, similar portions are designated by the same reference numerals.

Figure 3B:
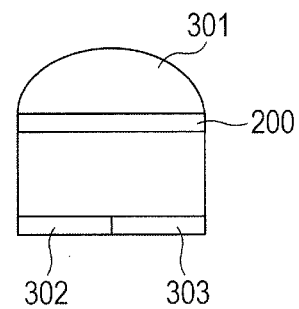

In FIG. 3A and FIG. 3B, a micro lens 301 has a pupil dividing function, and condenses luminous fluxes which have been output from the imaging optical system. The color filter 200 transmits only light having a specific wavelength therethrough, out of luminous fluxes which have passed through the micro lens 301. Photoelectric conversion units 302, 303, 304 and 305 can photoelectrically convert luminous fluxes which the photoelectric conversion units have each received through the same micro lens, and can independently output the photoelectric conversion signal (pupil division). Incidentally, in the present exemplary embodiment, the pixel in the case of being simply described shall mean a unit pixel that is an assembled unit of the above described elements 301 to 305 and an element 200, which is formed under one micro lens of the imaging device 102. In addition, in the pixel, the photoelectric conversion unit corresponding to a position of the photoelectric conversion unit 302 is described as a divisional pixel A, the photoelectric conversion unit corresponding to a position of the photoelectric conversion unit 303 is described as a divisional pixel B, the photoelectric conversion unit corresponding to a position of the photoelectric conversion unit 304 is described as a divisional pixel C, and the photoelectric conversion unit corresponding to a position of the photoelectric conversion unit 305 is described as a divisional pixel D.

In addition, in the present exemplary embodiment, the example will be described below in which the four photoelectric conversion units constitute one pixel, but the number of the photoelectric conversion units which constitute one pixel is not limited to four. The photoelectric conversion units which constitute one pixel may be configured so as to be capable of independently receiving luminous fluxes which have passed through different regions of the exit pupil of the imaging optical system, respectively.

In addition, in the present exemplary embodiment, a configuration has been described which has the Bayer array of R, G and B as the pixel array of the imaging device 102, but spectral sensitivity characteristics of the color filter are not limited to the configuration. In addition, in the present exemplary embodiment, the example has been described in which one color filter is configured to correspond to one micro lens, but color filters having different spectral sensitivity characteristics may be configured to correspond to the divisional pixels under the micro lens, respectively.

Next, the detailed operation of image generation by the pupil divisional image generating unit 104 will be described.

The pupil divisional image generating unit 104 acquires signals (hereafter referred to as light field data) which are obtained in the divisional pixel A, the divisional pixel B, the divisional pixel C and the divisional pixel D, respectively, and generates a first image signal (pupil divisional image data) from signals obtained by the group of the divisional pixels A and a second image signal from signals obtained by the group of the divisional pixels B. In addition, the pupil divisional image generating unit 104 generates a third image signal from signals obtained by the group of the divisional pixels C, and a fourth image signal from signals obtained by the group of the divisional pixels D.

Figure 4:
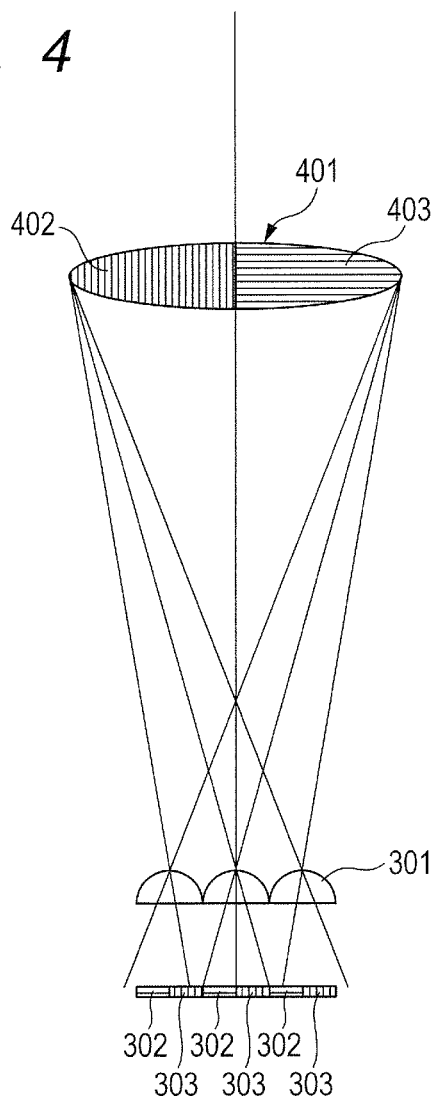
FIG. 4 is a view conceptually illustrating a relationship between the divisional pixel and an exit pupil region of an imaging optical system.

FIG. 4 is a view for describing a relationship between the exit pupil of the imaging optical system 101 and the divisional pixel. Incidentally, in FIG. 4, similar portions to those in FIG. 3A and FIG. 3B are designated by the same reference numerals. In addition, for the simplicity of description, the relationship shall be described below by focusing on the divisional pixel A and the divisional pixel B. Accordingly, the description which will be described later can be applied also to a combination of divisional pixels which have the same relationship as the positional relationship shown by the divisional pixel A and the divisional pixel B.

The image processing apparatus in the present exemplary embodiment is designed so that light which has been output from the exit pupil 401 of the imaging optical system is pupil-divided by the micro lenses 301, and so that the group 302 of the divisional pixels A receives luminous fluxes which have passed through a region 402, and the group 303 of the divisional pixels B receives luminous fluxes which have passed through a region 403. Accordingly, the first image signal and the second image signal become a pair of pupil divisional image data, which has parallax in a pupil divisional image direction. Each of the pair of pupil divisional images has a depth of field deeper than an F value of the imaging optical system 101 by two stages.

Next, the detailed operation of the color conversion unit 109 will be described.

The color conversion unit 109 interpolates information on a lost color at each of the pixel positions in the input image from the peripheral pixels, and generates color information Pix (R, G and B) corresponding to each of the pixel positions. The color conversion unit 109 converts the color information Pix (R, G and B) corresponding to each of the pixel positions, into predetermined colors Pix (R', G' and B') of a conversion target, which have been previously determined according to a photographing mode of the imaging apparatus 100, with the use of a lookup table. The detailed description of the color conversion processing with the use of the lookup table will be omitted here, but the color conversion processing can be achieved, for instance, by using a technology disclosed in Japanese Patent Application Laid-Open No. 2006-186594.

Incidentally, the technology disclosed in Japanese Patent Application Laid-Open No. 2006-186594 is color conversion processing in a YUV space, but it is easy to return the YUV space to the RGB space, by subjecting a pixel value in the YUV space after the color conversion to inverse conversion processing based on a matrix operation. The color conversion unit 109 subjects the whole image to the above described color conversion processing with the use of the lookup table, and corrects the color in the image, which is an object to be converted, to a color of a conversion target. Incidentally, in the present exemplary embodiment, the case has been described where the color of the conversion object and the color of the conversion target are determined according to the photographing mode, but the color conversion unit 109 may be configured so that a user can directly specify the color of the conversion object and the color of the conversion target by an unillustrated operation unit.

In addition, in the present exemplary embodiment, the example has been described in which the whole image is subjected to the image processing, but the present invention is not limited to the example. For instance, when such a photographing mode is set as to perform the image processing while regarding a specific object as an object, the image processing apparatus may estimate a region in which the specific object exists in the image by image analysis or the like, and limit an image processing object region.

Next, the detailed operation of the image synthesizing unit 108 will be described with reference to FIG. 5A to FIG. 5F. The image synthesizing unit 108 synthesizes the pupil divisional images, and generates image data (re-focus image) which can be acquired on an arbitrary focal plane (virtual imaging plane). FIG. 5A to FIG. 5F are views for describing operations of image synthesis processing. Incidentally, here, for the simplicity of description, the operation shall be described by focusing on the divisional pixel A and the divisional pixel B. The subsequent description can be applied also to a combination of divisional pixels which have the same relationship as the positional relationship shown by the divisional pixel A and the divisional pixel B.

Figure 5A:
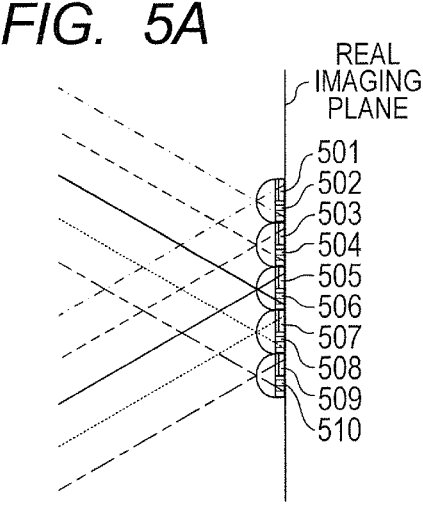
FIGS. 5A, 5B, 5C, 5D, 5E and 5F are views for describing image synthesis by light field data.

FIG. 5A illustrates a relationship between incident light and a focal plane in some region of the imaging device 102. The luminous fluxes that have passed through the exit pupil regions 402 and 403 which have been described in FIG. 4 are each pupil-divided by the micro lens, and the divisional pixels 502, 504, 506, 508 and 510 receive light of the luminous fluxes which have passed through the exit pupil region 403, respectively. In addition, the divisional pixels 501, 503, 505, 507 and 509 receive light of the luminous fluxes which have passed through the exit pupil region 402, respectively.

Figure 5B:
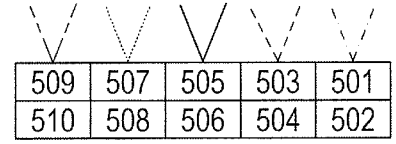

FIG. 5B is a view schematically illustrating the luminous fluxes which each of the divisional pixels receives, in FIG. 5A. Pairs of divisional pixels 501 and 502, 503 and 504, 505 and 506, 507 and 508, and 509 and 510 under the same micro lenses are added, respectively, and thereby pixel signals of imaged images shown by the same type of line segments can be obtained.

Figure 5C:
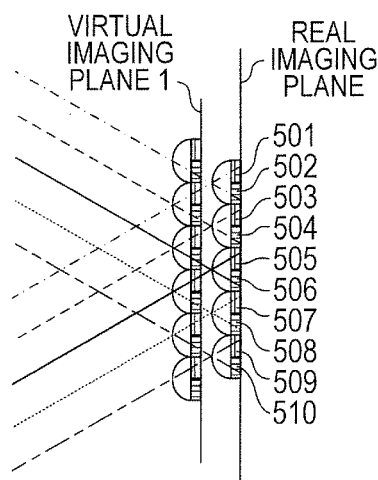
Figure 5D:
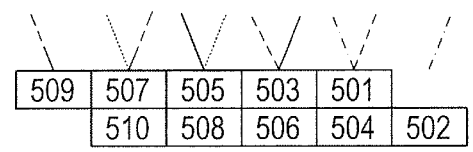
Figure 5E:
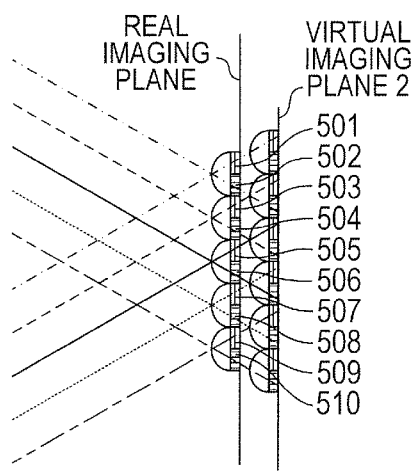

FIG. 5D illustrates an example in which groups of signals that have been obtained by the luminous fluxes which have passed through the exit pupil region 403 are shifted by one pixel, and the shifted groups of signals are added. Each of the divisional pixels has luminous ray information illustrated in FIG. 5A, and accordingly the signal obtained by the shift addition becomes a pixel signal of an imaged image shown by different types of line segments. Thus obtained pixel signal can be treated as a signal which is equivalent to a signal that can be acquired on a virtual imaging plane 1, as is illustrated in FIG. 5C.

Figure 5F:
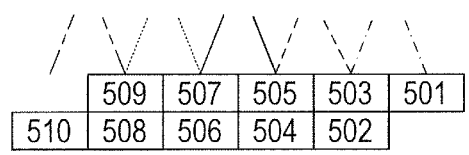

FIG. 5F is an example in which the groups of the pixel signals that have been obtained by the luminous fluxes which have passed the exit pupil region 403 are shifted by −1 pixel and the shifted groups of signals are added. The obtained pixel signal can be treated as a signal which is equivalent to a signal that can be acquired on a virtual imaging plane 2.

In the present exemplary embodiment, the image synthesis processing unit 108 adds pixel values in a shift amount of 0, specifically, pixel values of a pair of divisional pixels existing under the same micro lens, and thereby generates a synthetic image which is equivalent to photographed data by a conventional imaging apparatus. An expression will be described below according to which a synthetic image ImgAB in the present exemplary embodiment is generated. In the following Expression 1, ImgA and ImgB represent a pair of images to be input, and x and y represent coordinates in a horizontal direction and a vertical direction.

$$\mathrm{Img}AB(x,y)=\mathrm{Img}A(x,y)+\mathrm{Img}B(x,y) \quad \text{Expression 1}$$

Incidentally, the expression shown here is only one example, and the expression may be appropriately modified according to the number and the characteristics of the divisional pixels which are included in the pixel unit.

Figure 6:
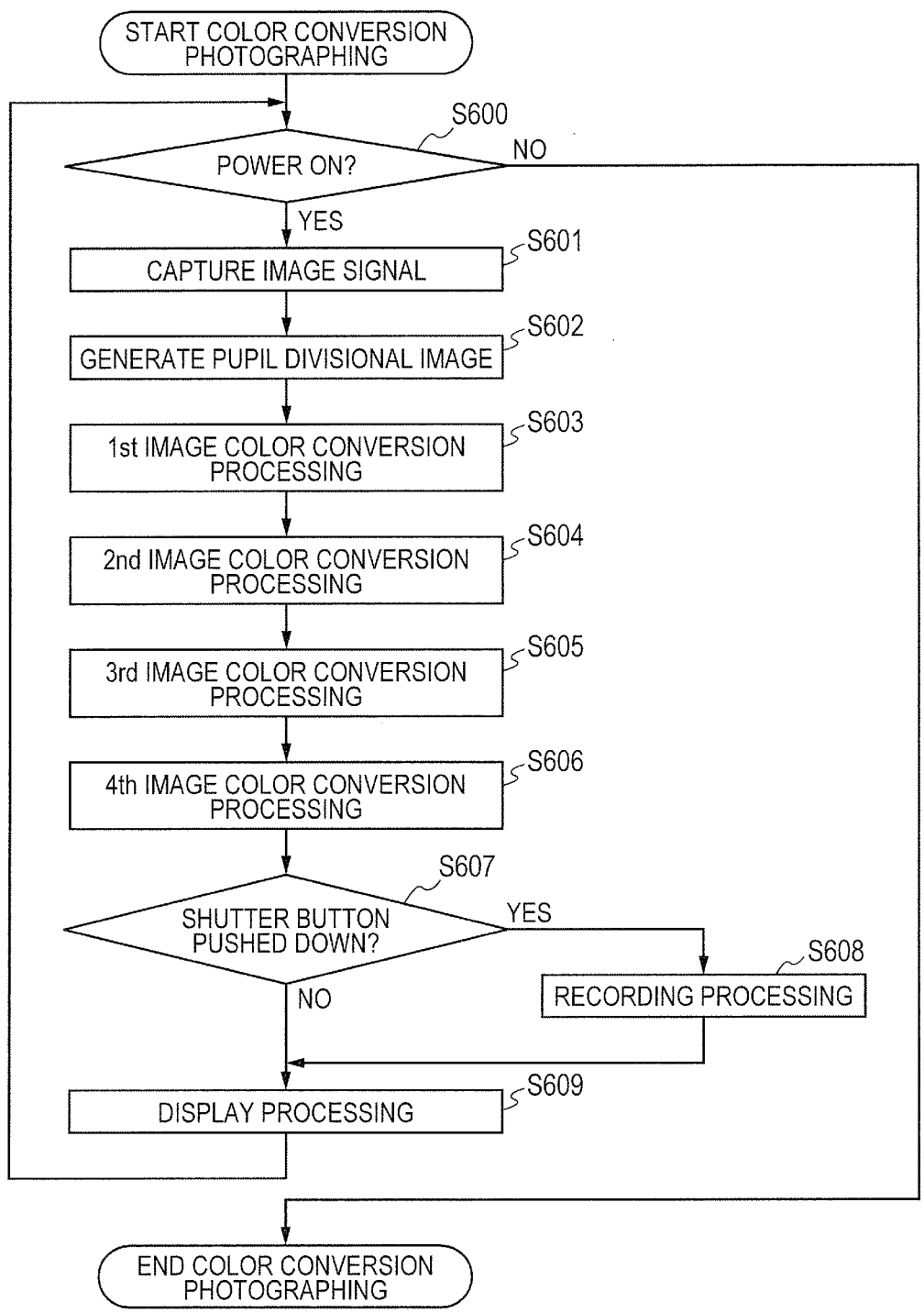
FIG. 6 is a view illustrating a flow chart of a photographing operation of the imaging apparatus to which an image processing apparatus according to the first exemplary embodiment of the present invention is applied.

Next, a photographing operation of the imaging apparatus 100 to which an image processing apparatus according to the present exemplary embodiment is applied will be described with reference to FIG. 6. FIG. 6 is a view illustrating a flow chart of the photographing operation of the imaging apparatus 100 to which an image processing apparatus according to the present exemplary embodiment is applied. The present operation is achieved by making a system controlling unit 105 load and execute an operation control program stored in a memory 110, and thereby control each unit of the imaging apparatus 100.

The imaging apparatus 100 repeats color conversion photographing processing while an unillustrated power switch is turned ON ("Y" in step S600). When the color conversion photographing is started ("Y" in step S600), firstly, in a step S601, the pupil divisional image generating unit 104 acquires an image signal of an object, which has been generated by the imaging device 102 and the A/D conversion unit 103. Next, in a step S602, the pupil divisional image generating unit 104 generates a pair of pupil divisional image data from each of the image signals of the group of the divisional pixels A and the group of the divisional pixels B. The pupil divisional image data which has been generated in the step S602 is sequentially input to the color conversion processing unit 109.

Next, in a step S603, color conversion processing of first pupil divisional image data is performed which is output in the step S602, based on a color of a conversion object and a color of a conversion target which are determined according to the photographing mode by the color conversion processing unit 109. Next, in a step S604, color conversion processing of second pupil divisional image data is performed which is output in the step S602, based on a color of a conversion object and a color of a conversion target which are determined according to the photographing mode by the color conversion processing unit 109.

Next, in a step S605, color conversion processing of third pupil divisional image data is performed which is output in the step S602, based on a color of a conversion object and a color of a conversion target which are determined according to the photographing mode by the color conversion processing unit 109. Next, in a step S606, color conversion processing of fourth pupil divisional image data is performed which is output in the step S602, based on a color of a conversion object and a color of a conversion target which are determined according to the photographing mode by the color conversion processing unit 109.

Next, in a step S607, the imaging apparatus determines whether an unillustrated shutter button is pushed or not. When the shutter button has been pushed, the processing proceeds to a step S608, and the imaging apparatus performs recording processing of the photographed image. When the shutter button is not pushed, the processing proceeds to display processing in a step S609.

In the step S608, the imaging apparatus stores the data (light field data) of a divisional pixel unit in the recording medium 111, which is contained in the first pupil divisional image data and the second pupil divisional image data that have been submitted to the color conversion processing, and the processing proceeds to the display processing of the step S609. In the step S609, the image synthesis processing unit 108 performs image synthesis processing, and outputs the synthetic image. The display unit 107 displays the output synthetic image thereon. When the display processing of the step S609 has ended, the processing returns to the step S600. When the power switch is turned ON, the pupil divisional image generating unit 104 captures an image signal of the next frame in the step S601, and the imaging apparatus repeatedly executes a series of the above described operation.

Incidentally, in the present exemplary embodiment, the color conversion processing of converting the color of the conversion object into the color of the conversion target has been described as the example of the image processing, but the scope of the present invention is not limited to the color conversion processing. Any image processing can be applied to the present invention as long as the image processing is image processing which is performed according to the region in the image, or is performed with the use of information specific to the object.

In addition, in the present exemplary embodiment, the example has been described in which the imaging apparatus records the correction data of the divisional pixel unit in the recording medium as it is. However, after the image synthesizing unit 108 has synthesized the pupil divisional image of which the color has been converted, the imaging apparatus may record the synthesized image.

In addition, in the present exemplary embodiment, the example has been described in which the pair of pupil divisional images is sequentially processed with the use of one color conversion unit. However, the imaging apparatus 100 may be configured so as to have a second color conversion unit and progress the color conversion processes in parallel, and then can shorten a processing time period to be spent for the color conversion. In addition, the imaging apparatus 100 may be configured so as to have a further large number of color conversion units according to the number of the pupil divisional images.

As described above, when the image processing is performed on the pupil divisional image data which has been generated from the group of luminous fluxes that have passed through different regions on the exit pupil and have been received, respectively, a problem of image processing can be solved, which originates in blurring.

[Exemplary Embodiment 2]

Next, a second exemplary embodiment of the present invention will be described with reference to FIG. 7 to FIG. 10.

Figure 7:
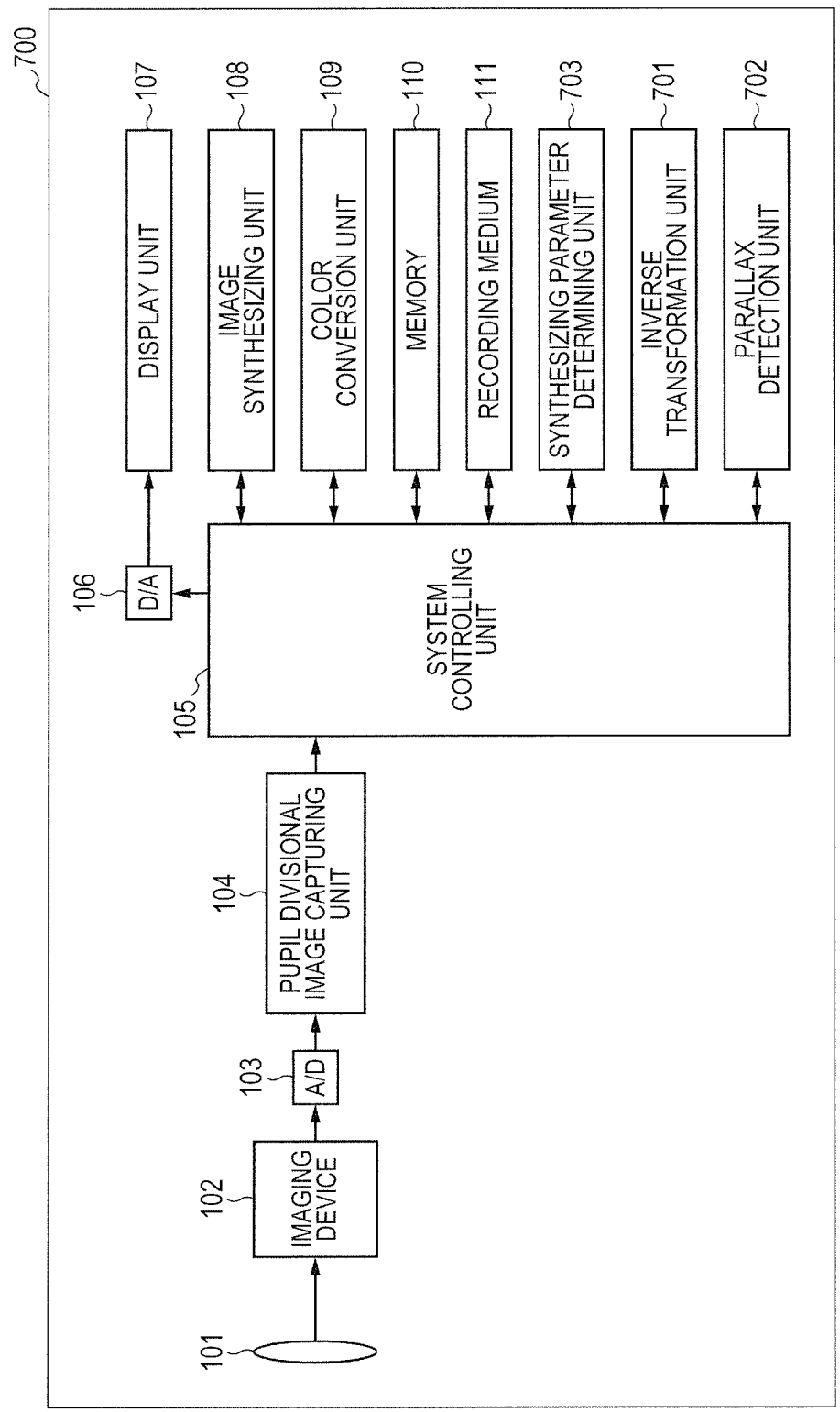
FIG. 7 is a block diagram illustrating a configuration of an imaging apparatus to which an image processing apparatus according to a second exemplary embodiment of the present invention is applied.

FIG. 7 is a block diagram illustrating a configuration of an imaging apparatus 700 to which an image processing apparatus according to a second exemplary embodiment of the present invention is applied. Incidentally, in FIG. 7, similar portions to those in FIG. 1 are designated by the same reference numerals.

In FIG. 7, the imaging apparatus 700 is similar to the imaging apparatus 100 of the exemplary embodiment illustrated in FIG. 1, except that an inverse transformation unit 701, a parallax detection unit 702 and a synthesizing parameter determining unit 703 are added. In the present exemplary embodiment, only the following points will be described below: operations of added inverse transformation unit 701, parallax detection unit 702 and synthesizing parameter determining unit 703; and how the corrected light field data is obtained through the color conversion processing by the color conversion unit 109, in the imaging apparatus of the present exemplary embodiment.

Firstly, the parallax detection unit 702 will be described below. The parallax detection unit 702 detects a quantity of a parallax from a pair of input pupil divisional image data (image signal). The parallax detection unit 702 determines, out of the pair of pupil divisional images which have been input thereto, one pupil divisional image as a standard image and the other pupil divisional image as a reference image; and determines correlation in the set detection region while shifting the reference image. The detailed description of the method of determining the correlation is omitted, but a known technology, for instance, such as SAD and SSD may be used, which are technologies of pattern matching (template matching).

An operation for determining the correlation is repeated while the reference image is shifted in a parallax direction in a pixel unit, and thereby the shift amount up to the position at which the correlation becomes highest can be determined for each of the pixels. A parallax map in which the quantity of the parallax for the same object is converted into the pixel value is generated with the use of the shift amount up to the position at which the correlation becomes highest.

Figure 8A:
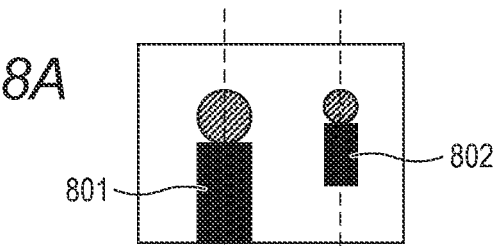
FIGS. 8A, 8B and 8C are views for describing parallax maps.
Figure 8B:
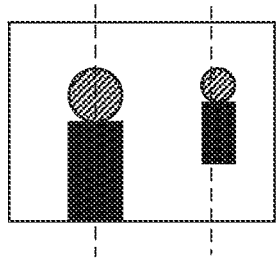
Figure 8C:
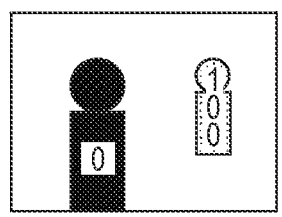

FIG. 8A to FIG. 8C are views for describing the parallax map. Incidentally, for the simplicity of description, the parallax map shall be described by focusing on the divisional pixel A and the divisional pixel B, here. The subsequent description can be applied also to a combination of divisional pixels which have the same relationship as the positional relationship shown by the divisional pixel A and the divisional pixel B.

FIG. 8A is a pupil divisional image which is acquired from the group of the divisional pixels A, and is an image which is treated as a standard image in the parallax detection unit 702. FIG. 8B is a pupil divisional image which is acquired from the group of the divisional pixels B, and is an image which is treated as a reference image in the parallax detection unit 702. Objects 801 and 802 are shown there. The object 801 exists at a position closer to the imaging apparatus than the object 802. FIG. 8C is a parallax map which has been generated from the standard image and the reference image, and is mapped while regarding the parallax as a pixel value. FIG. 8C illustrates that the quantity of the parallax of the object 801 is 0, and the quantity of the parallax of the object 802 is 100.

Next, the operation of the synthesizing parameter determining unit 703 will be described.

Image synthesis processing which will be described later is performed on each of the values which the quantity of the parallaxes can take, and thereby an image which focuses on the predetermined object can be obtained. However, it takes a time period for the processing to perform the image synthesis processing on all of the quantity of the parallaxes which can be taken, and the method is not practical. For this reason, the synthesizing parameter determining unit 703 determines a parameter for efficiently generating the synthetic image, based on the distribution of the quantity of the parallax in the parallax map.

Firstly, the synthesizing parameter determining unit 703 takes a statistic of the pixel values in the parallax map (Parallax Map), and determines the distribution of the quantity of the parallax. Then, the synthesizing parameter determining unit 703 determines the quantity of the parallax (pixel value) which appears in the distribution. For instance, when the pixel values in some region of the parallax map are values as in the following Parallax Map, the quantity of the parallaxes (Param 1) which appear in the distribution become 50, 10, 20 and 100.

Parallax Map={50, 50, 50, 10, 10, 50, 50, 20, 20, 20, 100}
Param 1={50, 10, 20, 100}

Next, the synthesizing parameter determining unit 703 rearranges the quantity of the parallaxes (Param 1) which appear in the distribution, according to a predetermined condition, and determines priority.

For instance, the synthesizing parameter determining unit 703 rearranges the quantity of the parallaxes in ascending order of the absolute value of the quantity of the parallax, and determines the priority.

Param 2={10, 20, 50, 100}

Next, the parameters are extracted only by a previously determined number of the synthesis processes, in order of priority. Here, suppose that three color conversion processes can be performed per one frame, a parameter Param 3 is expressed in the following way, when the priority and the time period for the processing are considered.

Param 3={10, 20, 50}

Thus determined synthesizing parameter (Param 3) becomes a synthesizing parameter which can preferentially process an object that is close to a focal plane at the time of photographing. The Param 3 is effective in such a case that when the image processing is performed on the object which has been focused at the time of photographing, for instance, a fine parallax occurs in the object region.

In addition, it is also acceptable as another condition of determining the priority to rearrange the quantity of the parallax in a descending order of frequency in which the quantity of the parallax appears in the distribution, and determine the priority.

Param 4={50, 20, 10, 100}

When the parameters are extracted from the Param 4 only by a previously determined number of the synthesis processes in order of priority, the parameter is expressed in the following way.

Param 5={50, 20, 10}

Thus determined synthesizing parameter (Param 5) becomes a synthesizing parameter which has given a higher priority to an object which occupies the largest region in the picture composition at the time when having been photographed. The Param 5 is effective in the case where the image processing is performed on the whole screen so as to preferentially process an object which occupies a wider area in the photographing image, for instance, when there exist a plurality of objects of which distances are different in a field.

In addition, it is also acceptable as a method for determining a shift amount other than the distribution of the quantity of the parallax to determine a depth of field according to lens information (F value and focal length) which is an imaging parameter, and determine the shift amount based on the depth of the field.

Incidentally, in the case where the discrete shift amount is previously determined, and there exist pixels having a discretely determined quantity of the parallax between parallaxes, a result to be obtained by image processing which will be described later may also be subjected to linear interpolation processing.

In addition, it is also acceptable as a method for determining the shift amount other than the distribution of the quantity of the parallax to concomitantly use a technology of recognizing an object such as image analysis and human detection according to the photographing mode, and determine an arbitrary shift amount. When the photographing mode is set so as to perform correction, for instance, of a human who is an object, it is acceptable to extract a human region from the standard image by the image analysis, and use the quantity of the parallax corresponding to the above described human region as a shift amount for synthesis. In addition, it is also acceptable that a user can arbitrarily specify the shift amount or the priority with an unillustrated operation unit.

The method for determining the synthesizing parameter has been described above, but any method is acceptable as long as the method can determine the synthesizing parameter by which the object is focused that becomes an object of color conversion processing, in a process of forming the synthetic image, which will be described later.

Next, the operation of the image synthesizing unit 108 in the present exemplary embodiment will be described.

In the present exemplary embodiment, the image synthesizing unit 108 generates a synthetic image based on the pair of pupil divisional images and a shift amount (virtual imaging plane) which is determined by the synthesizing parameter determining unit 703. Incidentally, for the simplicity of description, the parallax map shall be described below by focusing on the divisional pixel A and the divisional pixel B. The subsequent description can be applied also to a combination of divisional pixels which have the same relationship as the positional relationship shown by the divisional pixel A and the divisional pixel B.

An expression for synthesizing pixel values of each coordinate of a synthetic image ImgAB is shown below.

$$ImgAB(x,y)=ImgA(x,y)+ImgB(x+shift,y). \qquad \text{Expression 2}$$

The ImgA and the ImgB represent a standard image before color conversion and an image for reference before the color conversion, respectively; x and y represent pixel coordinates in a horizontal direction and a vertical direction, respectively; and Shift represents a shift amount which is determined by the synthesizing parameter determining unit 703. Specifically, the synthetic image becomes an image in which the pair of pupil divisional images is shifted only by the Shift pixels in a parallax direction, and the resultant pupil divisional images are added and synthesized.

Figure 9A:
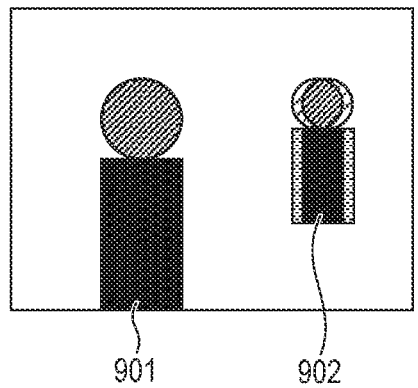
FIGS. 9A and 9B are a view for describing a synthetic image which is generated according to the parallax map.
Figure 9B:
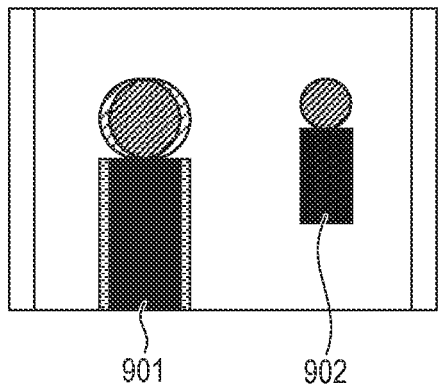

FIG. 9A and FIG. 9B illustrate synthetic images in which the pairs of pupil divisional images illustrated in FIG. 8A to FIG. 8C that have been used for describing the parallax map are synthesized with a shift amount of 0 and are synthesized with a shift amount of 100, respectively. The respective following images can be acquired: a synthetic image which has been synthesized with the shift amount of 0, and in which an object 901 is focused; and a synthetic image which has been synthesized with the shift amount of 100, and in which an object 902 is focused. Specifically, in order to synthesize an image in which an arbitrary region on the parallax map is focused, it is acceptable to shift (combine) the pupil divisional images in the arbitrary region on the parallax map only by the pixel value, and add the shifted pupil divisional images. Incidentally, the Expression 2 shown here is only one example, and the expression may also be appropriately modified according to the number and the characteristics of the divisional pixels which are included in the pixel unit.

Next, the operation of the inverse transformation unit 701 will be described. Incidentally, for the simplicity of description, the parallax map shall be described below by focusing on the divisional pixel A and the divisional pixel B. The subsequent description can be applied also to a combination of divisional pixels which have the same relationship as the positional relationship shown by the divisional pixel A and the divisional pixel B.

The inverse transformation unit 701 corrects a pixel value (light field data) of the divisional pixel based on the synthetic image on which the color conversion processing unit has performed the color conversion processing. The following Expression 3 holds in a region in which correlation is high, specifically, in a region which is focused.

$$ImgA(x,y) \approx ImgB(x+shift,y) \qquad \text{Expression 3}$$

The following Expression 4 and Expression 5 hold from Expression 2 and Expression 3.

$$ImgAB(x,y) \approx ImgA(x,y) + ImgA(x,y) \qquad \text{Expression 4}$$

$$ImgAB(x,y) \approx ImgB(x+shift,y) + ImgB(x+shift,y) \qquad \text{Expression 5}$$

As a result of the modification of Expression 4 and Expression 5, the divisional pixel value ImgB(x+shift, y) and the pixel value of the divisional pixel ImgA(x, y) can be introduced.

$$ImgB(x+shift,y) \approx ImgAB(x,y)/2 \qquad \text{Expression 6}$$

$$ImgA(x,y) \approx ImgAB(x,y)/2 \qquad \text{Expression 7}$$

The pixel values of each of the divisional pixels, which have determined in the above way, are overwritten on the ImgA(x,y) and the ImgB(x+shift,y).

Figure 11:
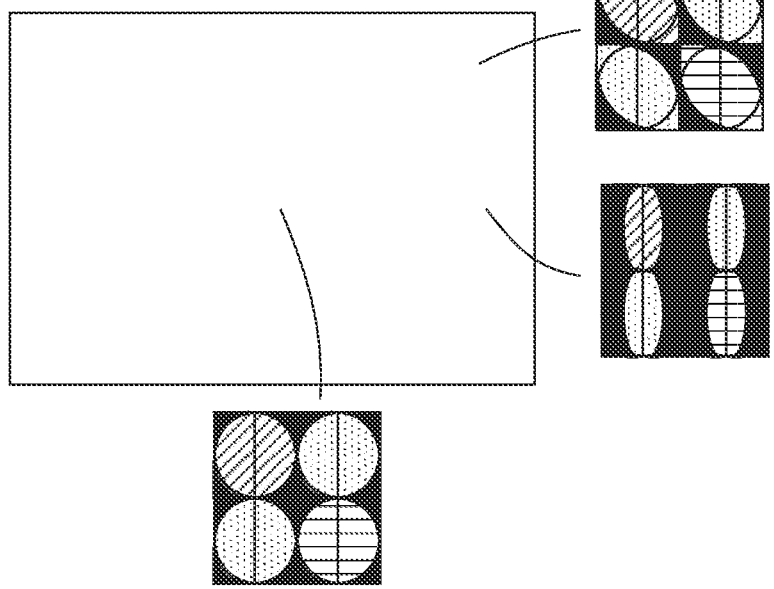
FIG. 11 is a view for describing a relationship between an imaging device and a shading shape.

Incidentally, the example has been described here in which the inverse conversion processing is performed with the use of the simple expressions for the description, but shading having different shapes occurs in the pupil divisional images according to the position in the imaging device, as is illustrated in FIG. 11.

Accordingly, the imaging apparatus previously holds the shading characteristics of each of the divisional pixels in the memory 110, which are included in the imaging device 102, and multiplies a gain at a ratio corresponding to the shading characteristics, according to the coordinates of each of the divisional pixels, which are calculated by Expression 6 and Expression 7. Then, the ImgA(x,y) and the ImgB(x+shift,y) become more natural correction results.

In addition, in the above description, the example has been shown in which the synthetic image that has been subjected to the color conversion is inversely converted, and thereby the values of each of the divisional pixels are determined, but because the parallax between each of the pixels has been already revealed, the determination of the values can be achieved with the use of another method. For instance, it is also acceptable to subject only the standard image to the color conversion, and to overwrite the pixel value of the standard image that has been subjected to the color conversion, on the pixel of the reference image, which corresponds to the quantity of the parallax.

In addition, it is also acceptable to associate the coordinate of the standard image with the coordinate of the reference image which has been shifted only by the corresponding quantity of the parallax so that the respective divisional pixels call the same color conversion table, and process the divisional pixels.

In addition, the expressions may be appropriately modified according to the number and the characteristics of the divisional pixels which are included in the pixel unit.

Figure 10:
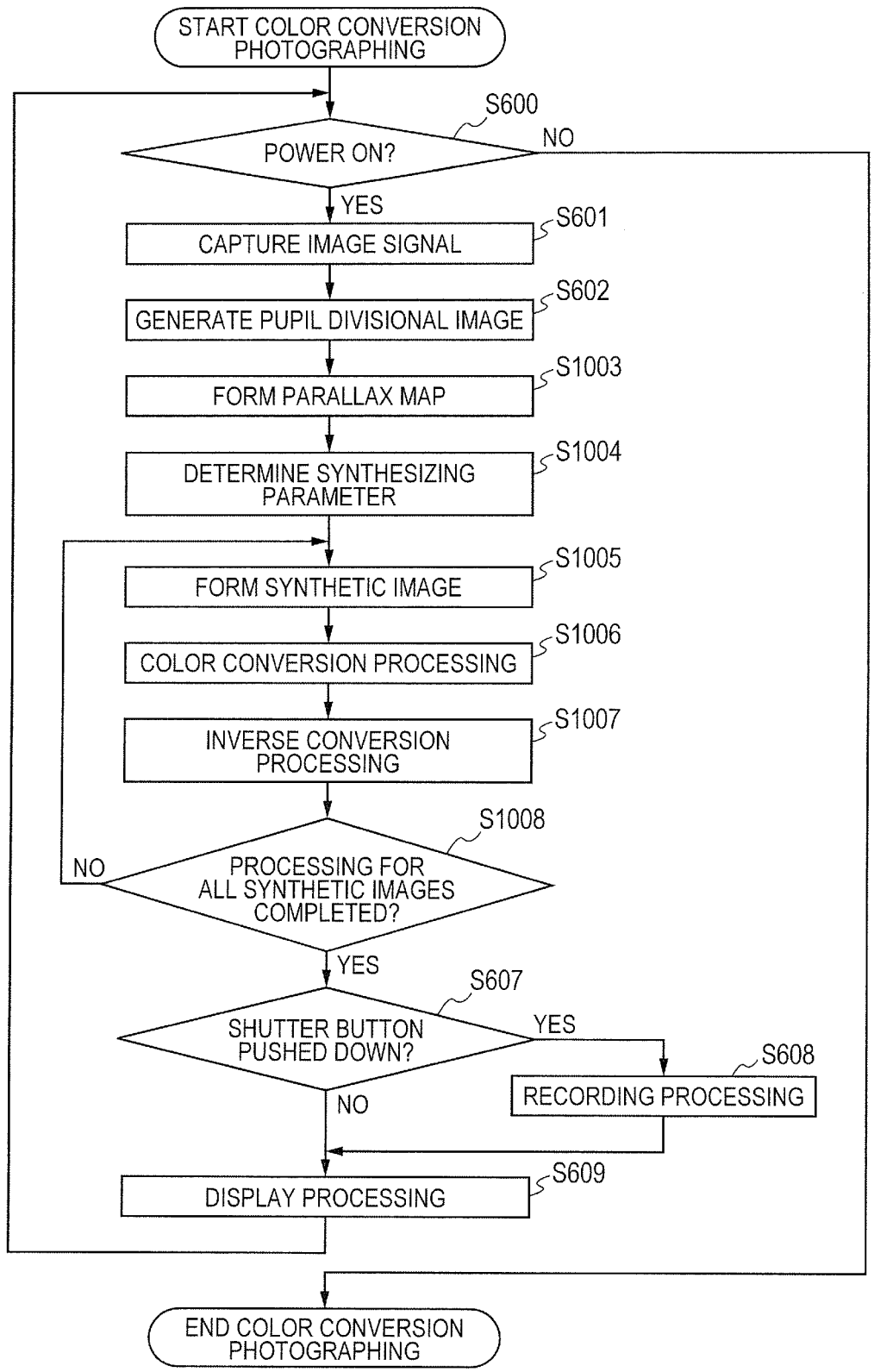
FIG. 10 is a view illustrating a flow chart of a photographing operation of an imaging apparatus to which an image processing apparatus according to the second exemplary embodiment of the present invention is applied.

Next, the photographing operation of the imaging apparatus 700 will be described below with reference to FIG. 10. FIG. 10 is a view illustrating a flow chart of the photographing operation of the imaging apparatus to which the image processing apparatus according to the present exemplary embodiment is applied. The present operation is achieved by making the system controlling unit 105 load and executes execute a computer program stored in the memory 110, and thereby control each unit of the imaging apparatus 100. Incidentally, in FIG. 10, portions which perform similar operations to those in the first exemplary embodiment of the present invention are designated by the same reference numerals.

The imaging apparatus 700 repeats color conversion photographing processing while an unillustrated power switch is turned ON ("Y" in step S600). The step S600 to step S602 are similar processes to those in the first exemplary embodiment, and accordingly the description will be omitted here.

In a step S1003, the parallax detection unit 702 detects the quantity of the parallax of the input pair of pupil divisional images, and generates the parallax map. Next, in a step S1004, the parallax map which has been acquired in the step S1003 is input to the synthesizing parameter determining unit 703, and a parameter for image synthesis is determined based on the parallax map, as described above. Subsequently, in a step S1005, the image synthesizing unit 108 performs the synthesis processing of the image, based on the parameter for the image synthesis and the pair of pupil divisional images.

Next, in a step S1006, the color conversion unit 109 performs the color conversion processing according to the photographing mode on the synthetic image which has been generated in the step S1005, and the synthetic image data which has been subjected to the color conversion processing is output to the inverse transformation unit 701.

Next, in a step S1007, the inverse transformation unit 701 performs inverse conversion processing based on the synthetic image which has been subjected to the color conversion and the parallax map, and corrects the pixel value of the divisional pixel data (light field data) of the region which is focused in the synthetic image.

Next, in a step S1008, it is determined whether the processing has ended or not for each of the shift amounts which are determined by the synthetic image parameter that has been determined in the step S1004. When an unprocessed synthesizing parameter (shift amount) remains, the processing returns to the step S1005, and the image synthesis processing is performed according to the unprocessed synthesizing parameter. On the other hand, when the processing has completed for all the synthesizing parameters (shift amounts), the processing proceeds to a step S607.

The processes subsequent to the step S607 are similar to those in the first exemplary embodiment, and accordingly the description will be omitted here.

As described above, the imaging apparatus subjects the synthetic image to the color conversion processing; performs such an inverse conversion processing as to convert the pixel value that has been subjected to the color conversion, at the position which is focused in the above described synthetic image, into the pixel value of the divisional pixel unit; and rewrites the converted value on the divisional pixel of the corresponding position. This operation enables the color conversion processing result to be reflected on the divisional pixel. Specifically, when the image processing result for the focused object is appropriately returned to the original divisional pixel position, the correction processing of the light field data for each of the objects can be achieved.

The above described present invention can provide an image processing apparatus which can correct the light field data so as to correspond to the image processing, in the image processing of a re-focus image, and can prevent incorrect correction of an image by various image processes, which originates in blurring. Incidentally, the above described exemplary embodiments are the examples in which the present invention has been applied to the imaging apparatus, but the present invention is not limited to the imaging apparatus. It goes without saying that the present invention can be applied also to information processing apparatuses such as a multiview camera which images object images having parallax between each other with a plurality of imaging devices and a PC.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-202274, filed Sep. 30, 2014, which is hereby incorporated by reference herein in its entirety.

What is claimed is:

1. An image processing apparatus comprising:
   (A) a memory that stores an operation control program; and
   (B) at least one processor coupled to the memory, and configured to load and to execute the operation control program stored in the memory
   a) to acquire light field data comprising a plurality of divided image data, including a first group of light field data received via a first group of divisional pixels, and a second group of light field data received via a second group of divisional pixels;
   b) to perform image processing, including color correction processing, on each of the first group of light field data and the second group of light field data of the plurality of divided image data; and
   c) to form synthesized image data by combining pixel signals of each of the first group of light field data and each of the second group of light field data, respectively, of the plurality of divided image data, wherein depths of field of the plurality of divided image data are greater than depth of field of the synthesized image data,
   wherein the at least one processor executes the operation control program to form the synthesized image data using the plurality of divided image data subjected to the image processing.

2. The image processing apparatus according to claim 1, wherein the first group of light field data and the second group of light field data correspond to different regions of an exit pupil, and the at least one processor, in executing the operation control program to perform the image processing, subjects each of the plurality of divided image data to the image processing so as to form corrected light field data.

3. The image processing apparatus according to claim 2, wherein the at least one processor executes the operation control program to perform the image processing on the plurality of pupil divided image data in parallel.

4. The image processing apparatus according to claim 2, wherein the at least one processor, in executing the operation control program, synthesizes the first group of light field data and the second group of light field data to form the synthesized image data of an object on a virtual imaging plane by adding, in combination, the plurality of divided image data.

5. The image processing apparatus according to claim 2, wherein the synthesized image data is image data of an object on a virtual imaging plane, formed by synthesizing the plurality of divided image data corresponding to the different regions of the exit pupil formed by the acquired light field data.

6. The image processing apparatus according to claim 5, wherein the at least one processor further executes the operation control program to determine a synthesizing parameter for forming the synthesized image data of the object on the virtual imaging plane, and
  wherein the synthesized image data of the object is formed on the virtual imaging plane based on the synthesizing parameter.

7. The image processing apparatus according to claim 6, wherein the at least one processor further executes the operation control program to form, the corrected light field data based on the synthesizing parameter, and
  wherein the at least one processor forms the corrected light field data using image data of a region in focus.

8. The image processing apparatus according to claim 6, wherein the at least one processor further executes the operation control program to detect a quantity of a parallax between the first group of light field data and the second group of light field data of the plurality of divided image data, and to determine the synthesizing parameter based on the quantity of the parallax.

9. The image processing apparatus according to claim 8, wherein the at least one processor further executes the operation control program to determine a priority of the synthesizing parameter based on a predetermined condition that includes at least one of a distribution of the quantity of the parallax, a largeness of an absolute value of the quantity of the parallax, a priority of a region having a small absolute value of the quantity of the parallax, and a priority of a region of a predetermined object, the region of the predetermined object being a region including at least a part of a human.

10. The image processing apparatus according to claim 8, wherein the at least one processor determines the synthesizing parameter based on an imaging parameter of the acquired light field data, and the imaging parameter is one capable of calculating a depth of field.

11. The image processing apparatus according to claim 8, wherein the synthesizing parameter is determined based on information designated by a user.

12. The image processing apparatus according to claim 6, wherein the at least one processor is further configured to execute the operation control program to determine a region to be subjected to the image processing based on a relation of the plurality of divided image data determined based on the synthesizing parameter.

13. The image processing apparatus according to claim 6, wherein the at least one processor forms corrected data of the light field data that does not correspond to the synthesizing parameter using a result of a plurality of the image processing according to the synthesizing parameter.

14. The image processing apparatus according to claim 1, wherein the color correction processing of the image processing is based on a lookup table.

15. The image processing apparatus according to claim 1, wherein the color correction processing includes color conversion processing that converts a color of a conversion object in the acquired light field data into a color of a conversion target using a lookup table.

16. An imaging apparatus comprising:
  (A) a memory that stores an operation control program; and
  (B) at least one processor coupled to the memory, and a system controlling unit and configured to load and to execute the operation control program stored in the memory
    (a) to have a pupil dividing function of an exit pupil of an imaging optical system for forming an optical image of an object, and forming light field data comprising a plurality of divided image data, including a first group of light field data from a first region of the exit pupil via a first group of divisional pixels, and a second group of light field data from a second region of the exit pupil via a second group of divisional pixels, by imaging the optical image;
    (b) to perform image processing, including color correction processing, on each of the first group of light field data and the second group of light field data of the plurality of divided image data;
    (c) to form synthesized image data by combining pixel signals of each of the first group of light field data and each of the second group of light field data, respectively, of the plurality of divided image data, wherein depths of field of the plurality of divided image data are greater than depth of field of the synthesized image data; and
    (d) to record corrected light field data based on the synthesized image data in a recording medium, wherein the at least one processor executes the operation control program to form the synthesized image data using the plurality of divided image data subjected to the image processing.

17. The imaging apparatus according to claim 16, wherein the at least one processor further executes the operation control program to function as a micro lens having the pupil dividing function arranged correspondingly to each of pixels of an imaging unit, each of the pixels having a plurality of divisional pixels, including at least one of the first group of divisional pixels and one of the second group of divisional pixels, and the corrected light field data being formed based on an output from the plurality of divisional pixels.

18. The imaging apparatus according to claim 16, wherein the optical image of the object is formed to have a parallax between a first image, formed from the first group of light field data, and a second image, formed from the second group of light field data, and the synthesized image data is formed based on an output from the first image and the second image.

19. A method of controlling an image processing apparatus, the method comprising:
  acquiring light field data comprising a plurality of divided image data, including a first group of light field data received via a first group of divisional pixels, and a second group of light field data received via a second group of divisional pixels;
  performing image processing, including color correction processing, on each of the first group of light field data and the second group of light field data of the plurality of divided image data; and
  forming synthesized image data by combining pixel signals of each of the first group of light field data and each of the second group of light field data, respectively, of the plurality of divided image data, wherein depths of field of the plurality of divided image data are greater than depth of field of the synthesized image data, and the synthesized image data is formed using the plurality of divided image data subjected to the image processing.

20. A non-transitory computer-readable recording medium storing a readable program that causes a computer:
  to acquire light field data comprising a plurality of divided image data, including a first group of light field data received via a first group of divisional pixels, and a second group of light field data received via a second group of divisional pixels;

to perform image processing, including color correction processing, on each of the first group of light field data and the second group of light field data of the plurality of divided image data; and to form synthesized image data by combining pixel signals of each of the first group of light field data and each of the second group of light field data, respectively, of the plurality of divided image data, wherein depths of field of the plurality of divided image data are greater than depth of field of the synthesized image data, and the synthesized image data is formed using the plurality of divided image data subjected to the image processing.

* * * * *